United States Patent [19]
Michishita

[11] Patent Number: 6,144,487
[45] Date of Patent: Nov. 7, 2000

[54] OPTICAL AMPLIFYING APPARATUS CAPABLE OF DETECTING AT LEAST ONE OF OPTICAL INDIVIDUAL SIGNALS

[75] Inventor: Yukio Michishita, Tokyo, Japan

[73] Assignee: NEC Corporation, Tokyo, Japan

[21] Appl. No.: 09/055,757

[22] Filed: Apr. 7, 1998

[30] Foreign Application Priority Data

Apr. 9, 1997 [JP] Japan .................................. 9-090540

[51] Int. Cl.$^7$ ...................................................... H01S 3/00
[52] U.S. Cl. ............................................. 359/341; 359/124
[58] Field of Search ..................................... 359/341, 124

[56] References Cited

U.S. PATENT DOCUMENTS

| | | | |
|---|---|---|---|
| 5,633,749 | 5/1997 | Shibuya | 359/341 |
| 5,675,432 | 10/1997 | Kosaka | 359/341 |
| 5,828,486 | 10/1998 | Yoshida | 359/341 |
| 5,864,423 | 1/1999 | Kosada | 359/341 |
| 5,870,217 | 2/1999 | Itou et al. | 359/179 |
| 5,903,385 | 5/1999 | Sugaya et al. | 359/341 |
| 5,907,429 | 5/1999 | Sugata | 359/341 |
| 6,038,062 | 3/2000 | Kosada | 359/337 |

FOREIGN PATENT DOCUMENTS

| | | |
|---|---|---|
| 7-202306 | 8/1995 | Japan . |
| 8-32554 | 2/1996 | Japan . |
| 8-163028 | 6/1996 | Japan . |
| 10-65650 | 3/1998 | Japan . |

OTHER PUBLICATIONS

"An Experiment on Optical Add–Drop Multiplexer Using Fiber Grating and It's Limiting Factor", Proceedings of the 1996 IEICE general conference B–11–7, p. 747.

Stephen B. Alexander, "Symposium on Advanced Networks", OFC '95 Technical Digest, pp. 224–225.

*Primary Examiner*—Mark Hellner
*Attorney, Agent, or Firm*—McGinn & Gibb, P.C.

[57] ABSTRACT

In an optical amplifying for amplifying an input wavelength multiplexed signal into an amplified output wavelength multiplexed signal, each of the input wavelength multiplexed signal and the amplified output wavelength multiplexed signal containing a plurality of optical component signals which have wavelengths different from one another, and each of which has an amplitude level, the optical amplifying apparatus comprises an optical amplifier for amplifying the input optical wavelength multiplexed signal into the amplified output wavelength multiplexed signal and an optical detecting circuit for individually detecting the amplitude level of at least one of the optical component signals.

19 Claims, 5 Drawing Sheets

OPTICAL AMPLIFYING APPARATUS CAPABLE OF DETECTING AT LEAST ONE OF OPTICAL INDIVIDUAL SIGNALS

BACKGROUND OF THE INVENTION

This invention relates to an optical amplifying apparatus which is operable as serves as an optical repeater amplifier used in an optical wavelength division multiplexing (will be abbreviated to WDM) communication system.

Heretofore, it is known in the art that a WDM communication system is capable of fast communicating information in a large capacity. This is because such a WDM communication system enables simultaneous communication of optical individual or component signals which have wavelengths different from one another on the same optical fiber. Herein, it is to be noted that the optical component signals are transmitted in the form of an optical wavelength multiplexed signal through on the same optical fiber that is operable as an optical transmission path and that the optical multiplexed signal has a transmission spectrum divided into a plurality of wavelength bands which are not overlapped with one another.

In such a WDM communication system, an optical amplifying apparatus is usually placed on the optical transmission path between an optical transmitter and an optical receiver to provide long distance communication.

In long distance optical communication systems using the optical amplifying apparatus, an output level of the optical amplifying apparatus should be kept at the best value to provide optimum transmission performance, in consideration of a non-linear effect of an optical fiber and optical noise (ASE: amplified spontaneous emission noise) in the optical amplifying apparatus.

This shows that an amplification gain must be favorably controlled in the optical amplifying apparatus to obtain the optical wavelength multiplexed signal with an optimum and constant output level. To this end, the conventional long distance optical communication systems monitor an output signal which is produced from the optical amplifying apparatus in the form of the optical wavelength multiplexed signal. The optical amplifying apparatus is controlled by the monitored result so that the optical wavelength multiplexed signal is kept at the optimum output level.

Under the circumstances, it should be noted that the individual or optical component signals which are multiplexed into the optical wavelength multiplexed signal and which are transmitted through the same optical fiber may be reduced in number due to a trouble or fault in the optical transmitter or on an upstream side. On the contrary, the optical individual signals may be increased in number when the number of the optical transmitters and the optical receivers is increased so as to cope with a larger transmission capacity.

Even if the number of the optical component signals is varied as mentioned above, it often happens that the optical wavelength multiplexed signal amplified by the optical amplifying apparatus is kept substantially invariable in an output level because the amplification gain of the optical amplifying apparatus is controlled with reference to the optical wavelength multiplexed signal as described above.

Herein, it is considered that the number of the optical component signals is reduced or increased. In this event, each level of the optical component signals is increased or reduced excessively. The reason for this is that the optical amplifying apparatus detects as the output level thereof only the optical wavelength multiplexed signal without detecting each level of the optical individual signals and controls the amplification gain on the basis of the optical wavelength multiplexed signal detected.

Such an individual excessive variation of the optical component signals often brings about a serious problem. For example, the optical receiver in the WDM communication system can normally receive the optical wavelength multiplexed signal but the optical receiver can not normally and individually receive each of the optical component signals. As the result, each necessary and original information is not accurately and individually monitored from the wavelength multiplexed signal. Namely, the WDM communication system can neither carry out nor guarantee accurate communication function thereof essentially.

SUMMARY OF THE INVENTION

It is therefore an object of the present invention to provide an optical amplifying apparatus capable of detecting at least one of output level of the optical component signals.

Other object of the present invention will become clear as the description proceeds.

An optical amplifying apparatus according to the present invention is for amplifying an input wavelength multiplexed signal into an amplified output wavelength multiplexed signal. Each of the input wavelength multiplexed signal and the amplified output wavelength multiplexed signal contain a plurality of optical component signals which have wavelengths different from one another, and each of which has an amplitude level. The optical amplifying apparatus comprises an optical amplifier for amplifying the input optical wavelength multiplexed signal into the amplified output wavelength multiplexed signal and an optical detecting circuit for individually detecting the amplitude level of at least one of the optical component signals.

According to an aspect of the present invention, the optical detecting circuit comprises an optical branch circuit for partially branching the amplified output wavelength multiplexed signal into a branched wavelength multiplexed signal, an optical de-multiplexer for de-multiplexing the branched wavelength multiplexed signal into a plurality of de-multiplexed optical component signals which are produced as the at least one of the optical component signals and which have wavelengths different from one another, an optical/electrical converter for individually converting the de-multiplexed optical component signals into electrical component signals, a detector for detecting the amplitude levels of the de-multiplexed optical component signals on the basis of the electrical component signals, and a selector for selecting one of the amplitude levels of the de-multiplexed optical component signals as the amplitude level of at least one of the optical component signals. The optical amplifying apparatus further comprises a gain controller for controlling a gain of the optical amplifier according to the selected one of the amplitude levels of the de-multiplexed optical component signals.

DESCRIPTION OF THE PREFERRED EMBODIMENTS

Figure 1:
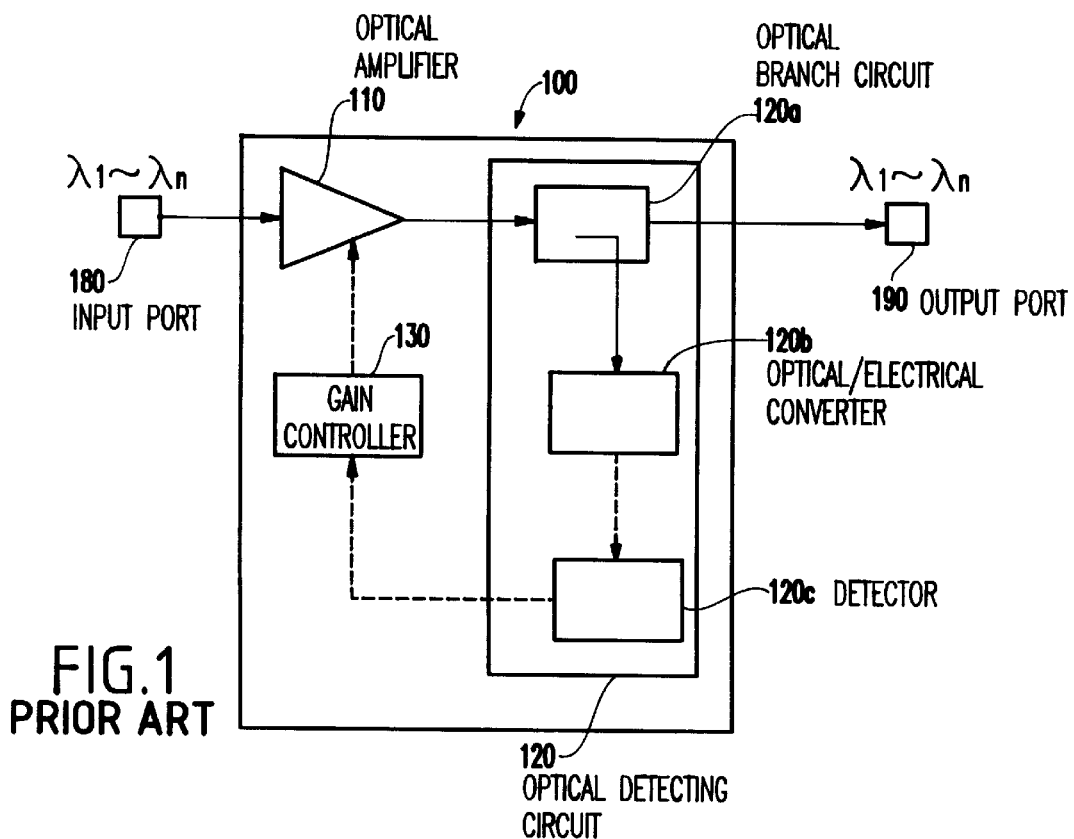
FIG. 1 is a block diagram showing configuration of a conventional optical amplifying apparatus.

In order to facilitate an understanding of the present invention, description will at first be made about a conventional optical amplifying apparatus with reference to the drawing.

Referring to FIG. 1, the conventional optical amplifying apparatus 100 is used, as a repeater amplifier, for amplifying an input wavelength multiplexed signal provided through an input port 180 into an amplified output wavelength multiplexed signal through an output port 190. Each of the input wavelength multiplexed signal and the amplified output wavelength multiplexed signal contain a plurality of optical component signals which have wavelengths $\lambda_1, \lambda_2, \ldots,$ and $\lambda_n$ different from one another and each of which has an amplitude level.

The optical amplifying apparatus 100 comprises an optical amplifier 110 for amplifying the input optical wavelength multiplexed signal provided through the input port 180 into the amplified output wavelength multiplexed signal through the output port 190 and an optical detecting circuit 120 for detecting the amplitude level of the amplified output wavelength multiplexed signal.

The detecting circuit 120 comprises an optical branch circuit 120a for partially branching the amplified output wavelength multiplexed signal into a branched wavelength multiplexed signal, an optical/electrical converter 120b for converting the branched wavelength multiplexed signal into an electrical wavelength multiplexed signal, and a detector 120c for detecting the amplitude level of the amplified output wavelength multiplexed signal on a basis of the electrical wavelength multiplexed signal.

The optical amplifying apparatus 100 further comprises a gain controller 130 for controlling a gain of the optical amplifier 110 according to the amplitude level of the amplified output wavelength multiplexed signal.

As apparent from the above, the conventional optical amplifying apparatus 100 detects only the optical wavelength multiplexed signal, but the optical amplifying apparatus 100 does not detect the optical component signals individually.

Herein, it is considered that the number of the optical component signals is reduced or increased. In this event, each level of the optical component signals is increased or reduced excessively. The reason for this is that the optical amplifying apparatus 100 detects as the output level thereof only the optical wavelength multiplexed signal without detecting each level of the optical individual signals and controls the amplification gain on the basis of the optical wavelength multiplexed signal detected.

Such an individual excessive variation of the optical component signals often brings about a serious problem. For example, the optical receiver in the WDM communication system can normally receive the optical wavelength multiplexed signal but the optical receiver can not normally and individually receive each of the optical component signals. As the result, each necessary and original information is not accurately and individually monitored from the wavelength multiplexed signal. Namely, the WDM communication system can neither carry out nor guarantee accurate communication function thereof essentially.

First Embodiment

Figure 2:
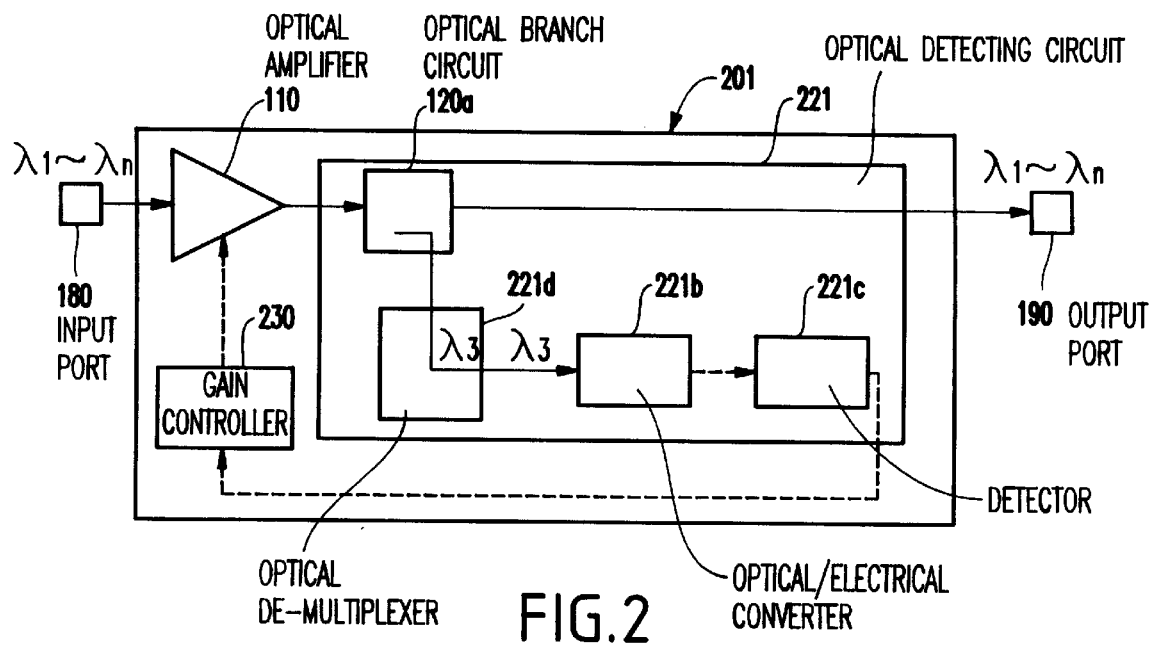
FIG. 2 is a block diagram showing configuration of an optical amplifying apparatus according to a preferred first embodiment of the present invention.

Referring to FIG. 2, an optical amplifying apparatus 201 according to a first embodiment of the present invention is used, as a repeater amplifier, for amplifying an input wavelength multiplexed signal provided through an input port 180 into an amplified output wavelength multiplexed signal through an output port 190. Each of the input wavelength multiplexed signal and the amplified output wavelength multiplexed signal containing a plurality of optical component signals which have wavelengths $\lambda_1, \lambda_2, \ldots$ and $\lambda_n$ different from one another and each of which has an amplitude level.

The optical amplifying apparatus 201 comprises an optical amplifier 110 for amplifying the input optical wavelength multiplexed signal provided through the input port 180 into the amplified output wavelength multiplexed signal through the output port 190, and an optical detecting circuit 221 for individually detecting the amplitude level of at least one of the optical component signals.

The detecting circuit 221 comprises an optical branch circuit 120a for partially branching the amplified output wavelength multiplexed signal into a branched wavelength multiplexed signal, an optical de-multiplexer 221d for de-multiplexing the branched wavelength multiplexed signal into a de-multiplexed optical component signal (for example, having the wavelength $\lambda_3$) as the at least one of the optical component signals corresponding to the wavelengths $\lambda_1$ through $\lambda_n$, an optical/electrical converter 221b for converting the de-multiplexed optical component signal into an electrical component signal, and a detector 221c for detecting the amplitude level of the de-multiplexed optical component signal having the wavelength $\lambda_3$, as the amplitude level of at least one of the optical component signals, on the basis of the electrical component signal.

The optical amplifying apparatus 201 further comprises a gain controller 230 for controlling a gain of the optical amplifier 110 according to the amplitude level of the de-multiplexed optical component signal having the wavelength $\lambda_3$.

Second Embodiment

Figure 3:
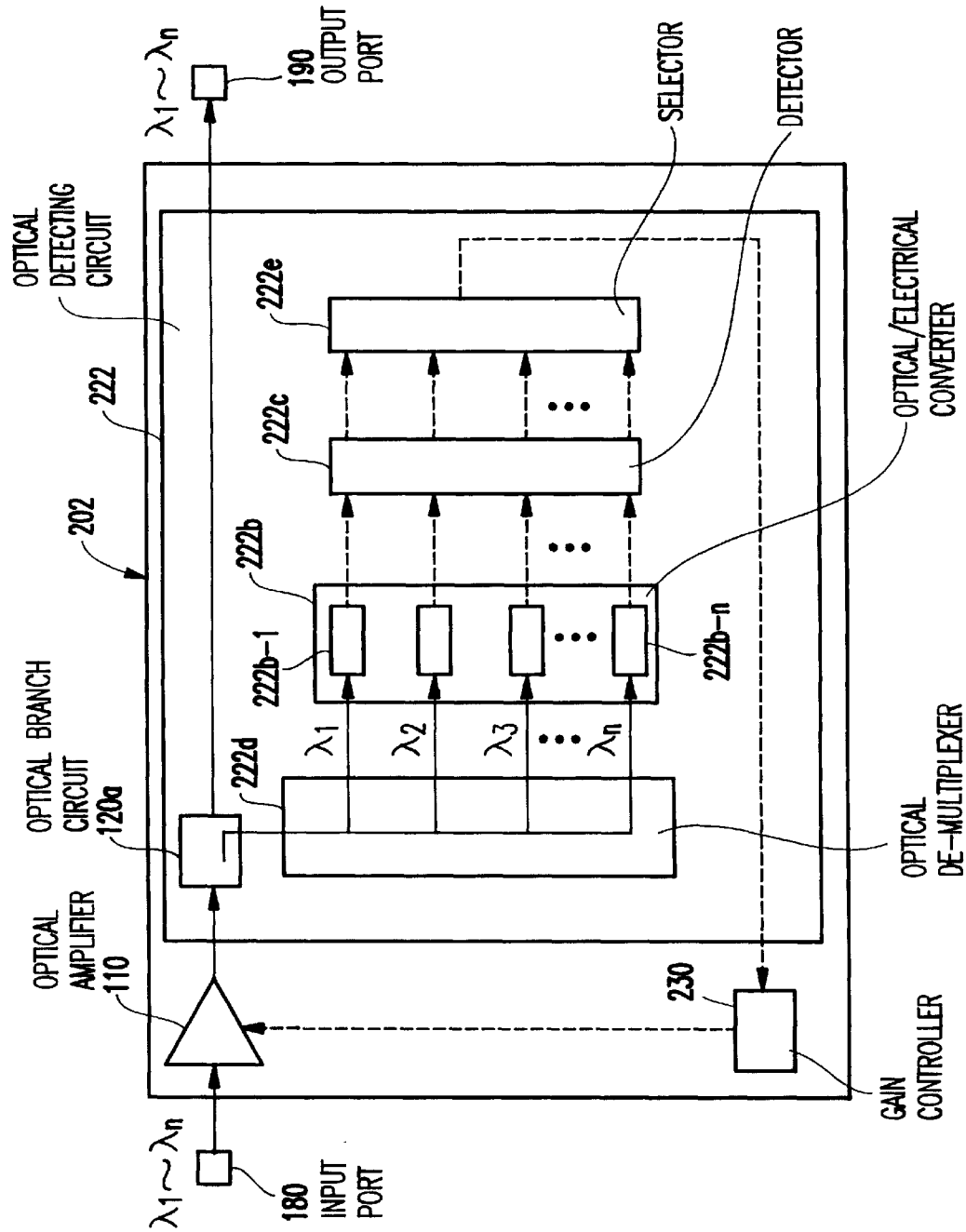
FIG. 3 is a block diagram showing configuration of an optical amplifying apparatus according to a preferred second embodiment of the present invention.

Referring to FIG. 3, an optical amplifying apparatus 202 used as repeater amplifier according to a second embodiment of the present invention is used, like the first embodiment of the present invention, for amplifying an input wavelength multiplexed signal provided through an input port 180 into an amplified output wavelength multiplexed signal through an output port 190. Each of the input wavelength multiplexed signal and the amplified output wavelength multiplexed signal containing a plurality of optical component signals which have wavelengths $\lambda_1, \lambda_2, \ldots,$ and $\lambda_n$ different from one another and each of which has an amplitude level.

The optical amplifying apparatus 202 comprises an optical amplifier 110 for amplifying the input optical wavelength multiplexed signal provided through the input port 180 into the amplified output wavelength multiplexed signal through the output port 190, and an optical detecting circuit 222 for individually detecting the amplitude level of at least one of the optical component signals.

The detecting circuit 222 comprises an optical branch circuit 120a for partially branching the amplified output wavelength multiplexed signal into a branched wavelength multiplexed signal, an optical de-multiplexer 222d for de-multiplexing the branched wavelength multiplexed signal into a plurality of de-multiplexed optical component signals which have wavelengths $\lambda_1$ through $\lambda_n$ different from one another and which are produced as the at least one of the optical component signals, an optical/electrical converter 222b which consists of converter sections 222b-1 through 222b-n and which is for individually converting the de-multiplexed optical component signals into electrical component signals, a detector 222c for detecting the amplitude levels of the de-multiplexed optical component signals on the basis of the electrical component signals, and a selector 222e for selecting one of the amplitude levels of the de-multiplexed optical component signals as the amplitude level of at least one of the optical component signals. For example, the selector 222e selects the de-multiplexed optical component signal which have the wavelength $\lambda_2$.

The optical amplifying apparatus 202 further comprises a gain controller 230 for controlling a gain of the optical amplifier 110 according to the selected one of the amplitude levels of the de-multiplexed optical component signals, that is, the signal which has the wavelength $\lambda_2$.

The selector 222e may select a minimum one of the amplitude levels of the de-multiplexed optical component signals as the amplitude level of at least one of the optical component signals.

Third Embodiment

Figure 4:
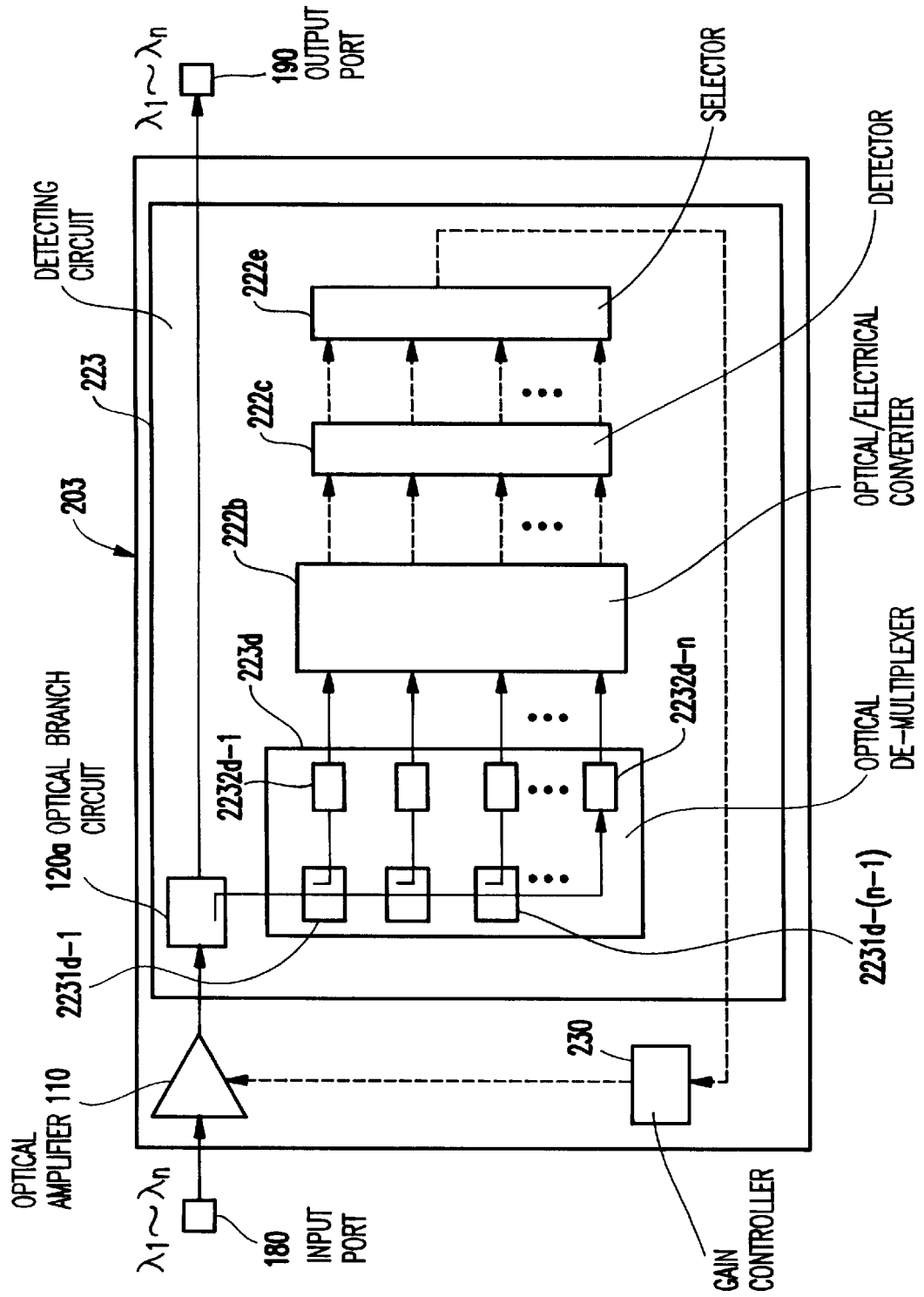
FIG. 4 is a block diagram showing configuration of an optical amplifying apparatus according to a preferred third embodiment of the present invention.

Referring to FIG. 4, an optical amplifying apparatus 203 used as repeater amplifier according to a third embodiment of the present invention comprises, like the second embodiment of the present invention, for amplifying an input wavelength multiplexed signal provided through an input port 180 into an amplified output wavelength multiplexed signal through an output port 190. Each of the input wavelength multiplexed signal and the amplified output wavelength multiplexed signal containing a plurality of optical component signals which have wavelengths $\lambda_1, \lambda_2, \ldots,$ and $\lambda_n$ different from one another and each of which has an amplitude level.

The optical amplifying apparatus 203 comprises, like the apparatus 202 illustrated in the second embodiment, an optical amplifier 110, an optical detecting circuit 223, and a gain controller 230.

The detecting circuit 223 comprises an optical branch circuit 120a, an optical de-multiplexer 223d for de-multiplexing the branched wavelength multiplexed signal into a plurality of de-multiplexed optical component signals which have wavelengths $\lambda_1$ through $\lambda_n$ different from one another and which are produced as the at least one of the optical component signals, an optical/electrical converter 222b which consists of converter sections 222b-1 through 222b-n, a detector 222c, and a selector 222e.

The optical de-multiplexer 223d comprises a group of optical couplers 2231d-1 through 2231d-(n−1) for branching the branched wavelength multiplexed signal into subsidiary branched wavelength multiplexed signals which are equal to the optical component signals in number, that is, n, and a group of optical band-pass filters 2232d-1 through 2232d-n for filtering the subsidiary branched wavelength multiplexed signals into the de-multiplexed optical component signals.

In the present invention, the group of optical band-pass filters 2232d-1 through 2232d-n may be instead of a group of optical fiber gratings disclosed in "An Experiment on Optical Add-Drop Multiplexer Using Fiber Grating and It's Limiting Factor in Proceedings of the 1996 IEICE general conference B-11-7 p. 747".

Fourth Embodiment

Figure 5:
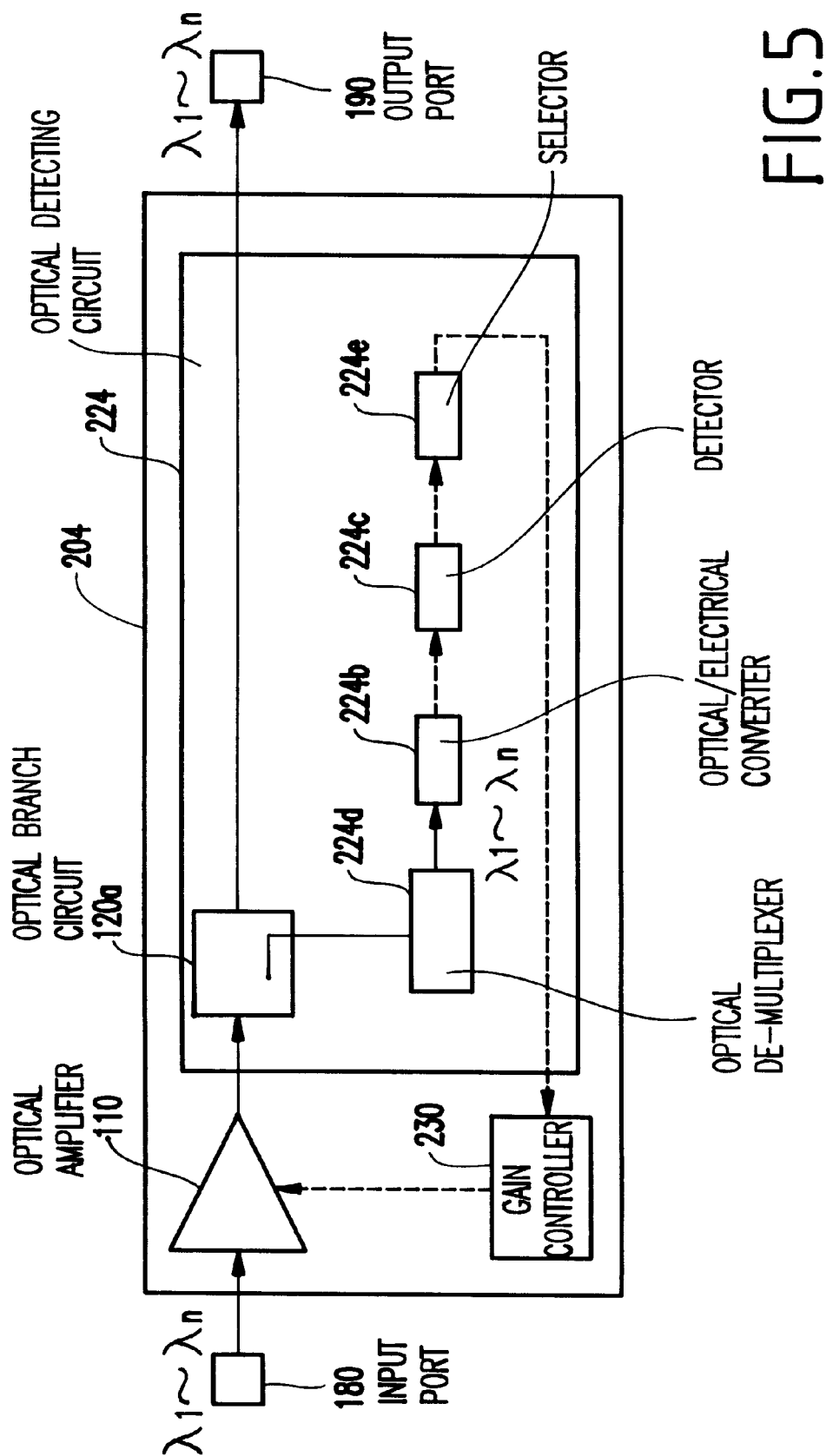
FIG. 5 is a block diagram showing configuration of an optical amplifying apparatus according to a preferred fourth embodiment of the present invention.

Referring to FIG. 5, an optical amplifying apparatus 204 used as repeater amplifier according to a fourth embodiment of the present invention comprises, like the second embodiment of the present invention, for amplifying an input wavelength multiplexed signal provided through an input port 180 into an amplified output wavelength multiplexed signal through an output port 190. Each of the input wavelength multiplexed signal and the amplified output wavelength multiplexed signal containing a plurality of optical component signals which have wavelengths $\lambda_1, \lambda_2, \ldots,$ and $\lambda_n$ different from one another and each of which has an amplitude level.

The optical amplifying apparatus 204 comprises, like the apparatus 202 illustrated in the second embodiment, an optical amplifier 110, an optical detecting circuit 224, and a gain controller 230.

The detecting circuit 224 comprises an optical branch circuit 120a, an optical de-multiplexer 224d for de-multiplexing the branched wavelength multiplexed signal into a plurality of de-multiplexed optical component signals which have wavelengths $\lambda_1$ through $\lambda_n$ different from one another and which are produced as the at least one of the optical component signals, an optical/electrical converter 224b, a detector 224c, and a selector 224e.

The optical de-multiplexer 224d consists of an optical wavelength variable filter for successively filtering the branched wavelength multiplexed signal into the de-multiplexed optical component signals one after another.

The optical/electrical converter 224b converting the de-multiplexed optical component signals into electrical component signals one after another. Likewise, the detector 224c detects the amplitude levels of the de-multiplexed optical component signals one after another on the basis of the electrical component signals. Thus, the selector 224e selects one of the amplitude levels of the de-multiplexed optical component signals as the amplitude level of at least one of the optical component signals.

In the present invention, the optical de-multiplexer may be a device which can de-multiplex with low loss the optical multiplexed signal and which is such as Arrayed-Waveguide-Grating multiplexer which is abbreviated to AWG and which is disclosed in OFC95 Technical Digest ThB1 pages. 224 to 225.

Fifth Embodiment

Figure 6:
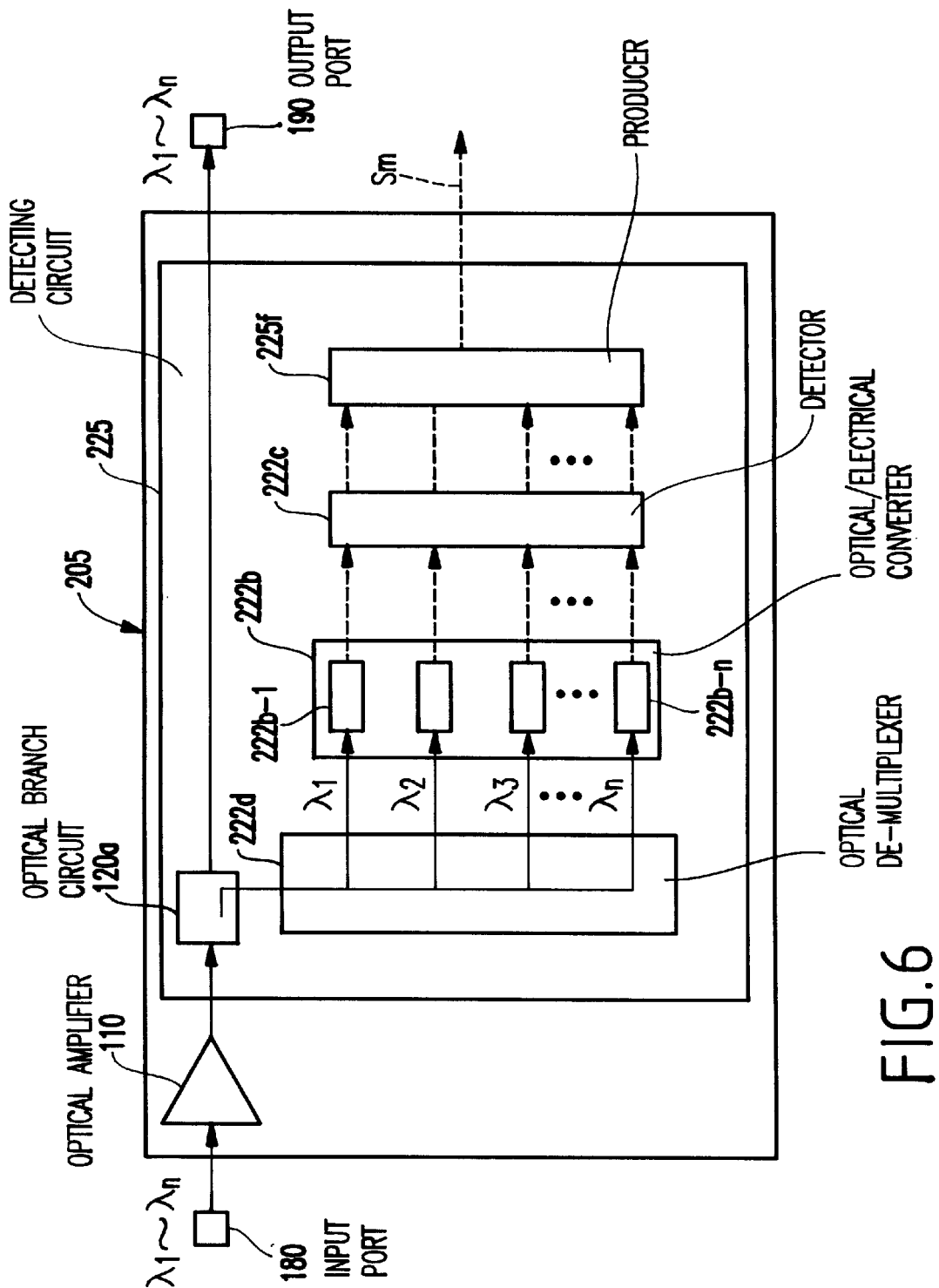
FIG. 6 is a block diagram showing configuration of an optical amplifying apparatus according to a preferred fifth embodiment of the present invention.

Referring to FIG. 6, an optical amplifying apparatus 205 used as repeater amplifier according to a fifth embodiment of the present invention comprises, like the second embodiment of the present invention, for amplifying an input wavelength multiplexed signal provided through an input port 180 into an amplified output wavelength multiplexed signal through an output port 190. Each of the input wavelength multiplexed signal and the amplified output wavelength multiplexed signal containing a plurality of optical component signals which have wavelengths $\lambda_1, \lambda_2, \ldots,$ and $\lambda_n$ different from one another and each of which has an amplitude level.

The optical amplifying apparatus 205 comprises, like the apparatus 202 illustrated in the second embodiment, an optical amplifier 110.

The detecting circuit 225 comprises an optical branch circuit 120a, an optical de-multiplexer 222d for de-multiplexing the branched wavelength multiplexed signal into a plurality of de-multiplexed optical component signals which have wavelengths $\lambda_1$ through $\lambda_n$ different from one another and which are produced as the at least one of the optical component signals, an optical/electrical converter 222b which consists of converter sections 222b-1 through 222b-n, a detector 222c for detecting each amplitude level of the de-multiplexed optical component signals as the amplitude level of at least one of the optical component signals on the basis of the electrical component signals, and a producer 225f for producing a monitor signal Sm which indicates each of the amplitude levels of the de-multiplexed optical component signals.

In the embodiment, the optical amplifying apparatus is communicable with an external apparatus which is not shown in FIG. 6. The optical amplifying apparatus may further comprise means (not shown in FIG. 6) for transferring the monitor signal Sm from the producer 225f to the external apparatus. Thus, the external apparatus can know such a condition as the amplitude level of each of the optical component signals which are transmitted to the optical amplifying apparatus 205.

What is claimed is:

1. An optical amplifying apparatus for amplifying an input wavelength multiplexed signal into an amplified output wavelength multiplexed signal, each of said input wavelength multiplexed signal and said amplified output wavelength multiplexed signal containing a plurality of optical component signals which have wavelengths different from one another, and each of which has an amplitude level, said optical amplifying apparatus comprising:

an optical amplifier for amplifying said input optical wavelength multiplexed signal including said plurality of optical component signals into said amplified output wavelength multiplexed signal;

an optical detecting circuit for individually detecting the amplitude level of at least one of the optical component signals, wherein each said amplitude level is selectively variable between each of said optical component signals; and a gain controller that controls said optical amplifier based on said amplitude level of only one of said at least one of the optical component signals such that said plurality of optical component signals are adjusted based on said amplitude level of said only one of the optical component signals.

2. An optical amplifying apparatus as claimed in claim 1, wherein said optical detecting circuit comprises an optical branch circuit for partially branching said amplified output wavelength multiplexed signal into a branched wavelength multiplexed signal;

an optical de-multiplexer for de-multiplexing said branched wavelength multiplexed signal into a de-multiplexed optical component signal as said at least one of the optical component signals;

an optical/electrical converter for converting said de-multiplexed optical component signal into an electrical component signal; and a detector for detecting said amplitude level of said de-multiplexed optical component signal, as said amplitude level of said only one of said optical component signals, on the basis of said electrical component signal;

wherein said gain controller controls a gain of said optical amplifier according to said amplitude level of said de-multiplexed optical component signal.

3. An optical amplifying apparatus for amplifying an input wavelength multiplexed signal into an amplified output wavelength multiplexed signal, each of said input wavelength multiplexed signal and said amplified output wavelength multiplexed signal containing a plurality of optical component signals which have wavelengths different from one another, and each of which has an amplitude level, said optical amplifying apparatus comprising:

an optical amplifier for amplifying said input optical wavelength multiplexed signal including said plurality of optical component signals into said amplified output wavelength multiplexed signal; and an optical detecting circuit for individually detecting the amplitude level of at least one of the optical component signals wherein said optical detecting circuit comprises:

an optical branch circuit for partially branching said amplified output wavelength multiplexed signal into a branched wavelength multiplexed signal;

an optical de-multiplexer for de-multiplexing said branched wavelength multiplexed signal into a plurality of de-multiplexed optical component signals which are produced as said at least one of the optical component signals and which have wavelengths different from one another;

an optical/electrical converter for individually converting said demultiplexed optical component signals into electrical component signals;

a detector for detecting said amplitude levels of said de-multiplexed optical component signals on the basis of said electrical component signals; and a selector for selecting one of said amplitude levels of said de-multiplexed optical component signals as said amplitude level of said at least one of said optical component signals;

wherein said optical amplifying apparatus further comprises a gain controller that controls a gain of said optical amplifier according to the selected one of said amplitude levels of said demultiplexed optical component signals such that said plurality of optical component signals are adjusted based on said selected one of said amplitude levels.

4. An optical amplifying apparatus as claimed in claim 3, wherein said selector selects a minimum one of said amplitude levels of said de-multiplexed optical component signals as said amplitude level of said only one of said optical component signals.

5. An optical amplifying apparatus as claimed in claim 3, wherein said optical de-multiplexer comprises:

a group of optical couplers for branching said branched wavelength multiplexed signal into subsidiary branched wavelength multiplexed signals which are equal to said optical component signals in number; and a group of optical band-pass filters for filtering said subsidiary branched wavelength multiplexed signals into the de-multiplexed optical component signals.

6. An optical amplifying apparatus as claimed in claim 3, wherein said optical de-multiplexer comprises:

an optical wavelength variable filter for successively filtering said branched wavelength multiplexed signal into said de-multiplexed optical component signals one after another.

7. An optical amplifying apparatus for amplifying an input wavelength multiplexed signal into an amplified output wavelength multiplexed signal, each of said input wavelength multiplexed signal and said amplified output wavelength multiplexed signal containing a plurality of optical component signals which have wavelengths different from one another, and each of which has an amplitude level, said optical amplifying apparatus comprising:

an optical amplifier for amplifying said input optical wavelength multiplexed signal into said amplified output wavelength multiplexed signal;

an optical detecting circuit for individually detecting the amplitude level of at least one of the optical component signals, wherein said optical detecting circuit comprises:

an optical branch circuit for partially branching said amplified output wavelength multiplexed signal into a branched wavelength multiplexed signal;

an optical de-multiplexer for de-multiplexing said branched wavelength multiplexed signal into a plurality of de-multiplexed optical component signals which are produced as said at least one of the optical component signals and which have wavelengths different from one another;

an optical/electrical converter for individually converting said de-multiplexed optical component signals into electrical component signals;

a detector for detecting each amplitude level of said de-multiplexed optical component signals as said amplitude level of at least one of said optical component signals on the basis of said electrical component signals to produce a monitor signal which indicates each of said amplitude levels of said de-multiplexed optical component signals, wherein said optical amplifying apparatus is communicable with an external apparatus, and said optical amplifying apparatus further comprises means for transferring said monitor signal to said external apparatus.

8. An optical amplifying apparatus as claimed in claim 1, wherein said at least one of the optical component signals comprises only one of the optical component signals.

9. An optical amplifying apparatus for amplifying an input wavelength multiplexed signal into an amplified output wavelength multiplexed signal, said input wavelength signal and said amplified output wavelength multiplexed signal each containing a plurality of optical component signals that have wavelengths different from one another, and each of which has an amplitude level, said optical amplifying apparatus comprising:

an optical amplifier that amplifies said input optical wavelength multiplexed signal including said plurality of optical component signals into said amplified output wavelength multiplexed signal;

an optical detecting circuit that detects the amplitude level of at least one of the optical component signals, wherein each said amplitude level is selectively variable between each of said optical component signals; and a gain controller that controls said optical amplifier based on said amplitude level of only one of said at least one of the optical component signals such that each of said optical component signals is amplified based on said amplitude level of said only one of the optical component signals.

10. An optical amplifying apparatus as claimed in claim 9, wherein said optical detecting circuit comprises an optical branch circuit for partially branching said amplified output wavelength multiplexed signal into a branched wavelength multiplexed signal;

an optical de-multiplexer for de-multiplexing said branched wavelength multiplexed signal into a de-multiplexed optical component signal as said at least one of the optical component signals;

an optical/electrical converter for converting said de-multiplexed optical component signal into an electrical component signal; and a detector for detecting said amplitude level of said de-multiplexed optical component signal, as said amplitude level of said only one of said optical component signals, on the basis of said electrical component signal, wherein said gain controller controls a gain of said optical amplifier according to said amplitude level of said de-multiplexed optical component signal.

11. An optical amplifying apparatus for amplifying an input wavelength multiplexed signal into an amplified output wavelength multiplexed signal, said input wavelength signal and said amplified output wavelength multiplexed signal each containing a plurality of optical component signals that have wavelengths different from one another, and each of which has an amplitude level, said optical amplifying apparatus comprising:

an optical amplifier that amplifies said input optical wavelength multiplexed signal including said plurality of optical component signals into said amplified output wavelength multiplexed signal;

an optical detecting circuit that detects the amplitude level of at least one of the optical component signals, wherein said optical detecting circuit comprises:

an optical branch circuit for partially branching said amplified output wavelength multiplexed signal into a branched wavelength multiplexed signal;

an optical de-multiplexer for de-multiplexing said branched wavelength multiplexed signal into a plurality of de-multiplexed optical component signals that are produced as said at least one of the optical component signals and which have wavelengths different from one another;

an optical/electrical converter for individually converting said de-multiplexed optical component signals into electrical component signals;

a detector for detecting said amplitude levels of said de-multiplexed optical component signals on the basis of said electrical component signals; and a selector for selecting one of said amplitude levels of said de-multiplexed optical component signals as said amplitude level of said at least one of said optical component signals;

wherein said optical amplifying apparatus farther comprises a gain controller that controls a gain of said optical amplifier according to the selected one of said amplitude levels of said de-multiplexed optical component signals such that each of said optical component signals is amplified based on said selected one of said amplitude levels.

12. An optical amplifying apparatus as claimed in claim 11, wherein said selector selects a minimum one of said amplitude levels of said de-multiplexed optical component signals as said amplitude level of said only one of said optical component signals.

13. An optical amplifying apparatus as claimed in claim 11, wherein said optical de-multiplexer comprises:

a group of optical couplers for branching said branched wavelength multiplexed signal into subsidiary branched wavelength multiplexed signals which are equal to said optical component signals in number; and a group of optical band-pass filters for filtering said subsidiary branched wavelength multiplexed signals into the de-multiplexed optical component signals.

14. An optical amplifying apparatus as claimed in claim 11, wherein said optical de-multiplexer comprises:

an optical wavelength variable filter for successively filtering said branched wavelength multiplexed signal into said de-multiplexed optical component signals one after another.

15. An optical amplifying apparatus as claimed in claim 10, wherein said at least one of the optical component signals comprises only one of the optical component signals.

16. An optical amplifying apparatus as claimed in claim 1, wherein said amplitude levels of the optical component signals are selectively variable over time.

17. An optical amplifying apparatus as claimed in claim 9, wherein said amplitude levels of the optical component signals are selectively variable over time.

18. An optical amplifying apparatus as claimed in claim 1, wherein said gain controller provides a uniform gain for each of said optical component signals so that the difference between the amplitude levels of each of said optical component signals remains fixed.

19. An optical amplifying apparatus as claimed in claim 9, wherein said gain controller provides a uniform gain for each of said optical component signals so that the difference between said amplitude levels of each of said optical component signals remains fixed.

* * * * *